United States Patent
Yedvab

(10) Patent No.: US 10,659,930 B2
(45) Date of Patent: May 19, 2020

(54) SYSTEMS AND METHODS FOR AD-HOC TRIGGER BASED DATA SHARING GROUP

(71) Applicant: Hagit Hava Yedvab, Modi'in (IL)

(72) Inventor: Hagit Hava Yedvab, Modi'in (IL)

(73) Assignee: CLIQA SOCIAL LTD, Modiin (IL)

( * ) Notice: Subject to any disclaimer, the term of this patent is extended or adjusted under 35 U.S.C. 154(b) by 0 days.

(21) Appl. No.: 16/307,154

(22) PCT Filed: Jun. 28, 2017

(86) PCT No.: PCT/IL2017/050719
§ 371 (c)(1),
(2) Date: Dec. 5, 2018

(87) PCT Pub. No.: WO2018/002927
PCT Pub. Date: Jan. 4, 2018

(65) Prior Publication Data
US 2019/0141488 A1   May 9, 2019

Related U.S. Application Data

(60) Provisional application No. 62/355,893, filed on Jun. 29, 2016.

(51) Int. Cl.
*H04W 4/08* (2009.01)
*H04W 4/38* (2018.01)
*H04W 4/02* (2018.01)

(52) U.S. Cl.
CPC ............. *H04W 4/08* (2013.01); *H04W 4/023* (2013.01); *H04W 4/38* (2018.02)

(58) Field of Classification Search
CPC .......... H04W 4/50; H04W 4/70; H04W 4/80; H04W 4/023; H04W 4/08; H04W 4/38
See application file for complete search history.

(56) References Cited

U.S. PATENT DOCUMENTS

| | | | |
|---|---|---|---|
| 8,161,106 B2 | 4/2012 | Quinn et al. | |
| 10,140,820 B1 * | 11/2018 | Zalewski | G07G 1/0072 |
| 10,355,730 B1 * | 7/2019 | Zalewski | H04L 67/10 |
| 2005/0113123 A1 | 5/2005 | Torvinen | |
| 2011/0142016 A1 | 6/2011 | Chatterjee | |
| 2015/0373143 A1 * | 12/2015 | Rajakarunanayake | H04W 4/21 709/205 |
| 2016/0337827 A1 * | 11/2016 | Bjontegard | H04W 4/029 |

* cited by examiner

*Primary Examiner* — Diane D Mizrahi

(57) ABSTRACT

Systems and methods for an application allowing a user to set and initiate data sharing group; allowing user to set automatic or semi-automatic trigger for allowing other computing devices to join and disconnect from the group; wherein said computing device receive and send predefined type of information, automatically, semi-automatically or manually to other computing devices in said group.

47 Claims, 3 Drawing Sheets

SYSTEMS AND METHODS FOR AD-HOC TRIGGER BASED DATA SHARING GROUP

RELATED APPLICATIONS

This application is a National Phase of PCT Patent Application No. PCT/IL2017/050719, entitled SYSTEMS AND METHODS FOR AD-HOC TRIGGER BASED DATA SHARING GROUP, having International filing date of Jun. 28, 2017, which claims the benefit of priority of U.S. Provisional Patent Application No. 62/355,893 filed on Jun. 29, 2016. The contents of the above applications are all incorporated by reference as if fully set forth herein in the entirety.

BACKGROUND

1. Technical Field

Embodiments of the present invention relate generally to systems and methods for ad-hoc trigger based data sharing group.

2. Description of Related Art

Current sharing applications do not allow successful automation of group creation and information sharing. For example, in cases of media (pictures, videos, etc.) gathering the media from multiple computing devices is tedious and difficult and requires use of multiple third party applications.

Hence, an improved systems and methods as described in this application are still a long felt need.

BRIEF SUMMARY

It is further within provision of the invention to be wherein

According to an aspect of the present invention a non-transitory computer-readable medium storing processor executable instructions on a computing device, when executed by a processor, the processor executable instructions causing the processor to perform: allowing a user to set and initiate at least one data sharing group or initiate at least one predefined group; allowing said user to set at least one automatic or semi-automatic trigger for allowing other computing devices to join said group; allowing said user to set at least one automatic or semi-automatic trigger for allowing or forcing other computing devices to disconnect from said group; receiving data communication from at least one other computing device; sensing information from at least one sensor; comparing said information from said at least one sensor and said received data from at least one other computer to said triggers; joining or rejecting said at least one other computing device to said group, wherein said computing device receive and send predefined type of information, automatically, semi-automatically or manually to other computing devices in said group.

According to an aspect of the present invention a non-transitory computer-readable medium storing processor executable instructions on a computing device, when executed by a processor, the processor executable instructions causing the processor to perform: allowing a user to set joining policy for found groups; allowing said user to set or initiate lookout for groups; sensing information from at least one sensor; initiating data communication to at least one other computing device found in said lookout; sending said information from said at least one sensor to said at least one other computing device found in said lookout; joining said at least one other computing device to said group according to said defined joining policy or terminate data communication, wherein said computing device receive and send predefined type of information, automatically, semi-automatically or manually to other computing devices in said group.

It is further within provision of the invention to be wherein said data communication and said received and sent information to said other computing devices in said group is partly or completely performed via proxy.

It is further within provision of the invention to further cause the processor to perform: allowing said user to share said received and sent information with computing device not joined to said group.

It is further within provision of the invention to further cause the processor to perform: allowing said user to allow at least one other computer device in said group to define said triggers and send notification to said at least one other computer device regarding said triggers.

It is further within provision of the invention to further cause the processor to perform: receiving notification from at least one other computer device in said group regarding said triggers; allowing said user to set at least one automatic or semi-automatic trigger for allowing other computing devices to join said group; and allowing said user to set at least one automatic or semi-automatic trigger for allowing or forcing other computing devices to disconnect from said group.

It is further within provision of the invention to further cause the processor to perform: allowing said user to interact with said received and sent information regardless of said group status.

It is further within provision of the invention to further be wherein said proxy partly or completely retain said information.

It is further within provision of the invention to further be wherein said user can interact with said retained information regardless of said group status.

It is further within provision of the invention to further be wherein said triggers are based on physical proximity between said devices and said sensor information relates or allow calculation of the physical proximity between said devices.

It is further within provision of the invention to further be wherein said sensor is selected from the group comprising: accelerometer, location sensors, light sensor, magnetic sensor, microphone, Bluetooth, Wi-Fi and cellular antenna.

It is further within provision of the invention to further be wherein said instructions are causing the processor to periodically perform: sensing information from at least one sensor; comparing said information from said at least one sensor and said received data from at least one other computer to said triggers; joining or rejecting said at least one other computing device to said group.

It is further within provision of the invention to further be wherein said triggers are based on physical proximity between said device and a known location and said sensor information relates or allow calculation of the physical proximity between said device and said known location.

It is further within provision of the invention to further be wherein said sent and received information is time limited according to a predefined timeframe or user inputted timeframe.

It is further within provision of the invention to further be wherein said at least one other computing device is a group of computing devices grouped separately.

It is further within provision of the invention to further be wherein said instructions are causing the processor to periodically perform: wherein said triggers are based on third party software applications.

It is further within provision of the invention to further be wherein said applications are purchasing transactions.

It is further within provision of the invention to further be wherein said known location is a moving object.

It is further within provision of the invention to further be wherein said known location is received from a third party provider.

It is further within provision of the invention to further allowing said user to terminate or set at least one automatic or semi-automatic trigger for termination of said group.

It is further within provision of the invention to further be wherein said triggers are based on third party computing devices.

According to another aspect of the invention a method for ad-hoc trigger based data sharing group comprising steps of: allowing a user to set and initiate at least one data sharing group or initiate at least one predefined group; allowing said user to set at least one automatic or semi-automatic trigger for allowing other computing devices to join said group; allowing said user to set at least one automatic or semi-automatic trigger for allowing or forcing other computing devices to disconnect from said group; allowing said user to terminate or set at least one automatic or semi-automatic trigger for termination of said group; receiving data communication from at least one other computing device; sensing information from at least one sensor; comparing said information from said at least one sensor and said received data from at least one other computer to said triggers; joining or rejecting said at least one other computing device to said group, wherein said computing device receive and send predefined type of information, automatically, semi-automatically or manually to other computing devices in said group.

It is further within provision of the invention to further be wherein said triggers are based on at least one chain of simple conditional statements predefined in said system or in a 3rd party application.

It is further within provision of the invention to further be wherein said instructions are causing the processor to perform: taking measures to allow monetary charging of 3rd party and/or said users.

It is further within provision of the invention to further be wherein said instructions are causing the processor to perform: manipulate said shared data.

It is further within provision of the invention to further be wherein said instructions are causing the processor to perform: managing database of predefined visual or audio data to be embedded in said shared data.

It is further within provision of the invention to further be wherein no user interface is presented to said user and all required local parameters for said computing device are predefined.

It is further within provision of the invention to further be wherein said instructions are causing the processor to perform: allowing said user to order merchandise with selected data presented on said merchandise by interfacing 3rd party supplier.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

In order to understand the invention and to see how it may be implemented in practice, a plurality of embodiments will now be described, by way of non-limiting example only, with reference to the accompanying drawings, in which.

DETAILED DESCRIPTION

Figure 1:
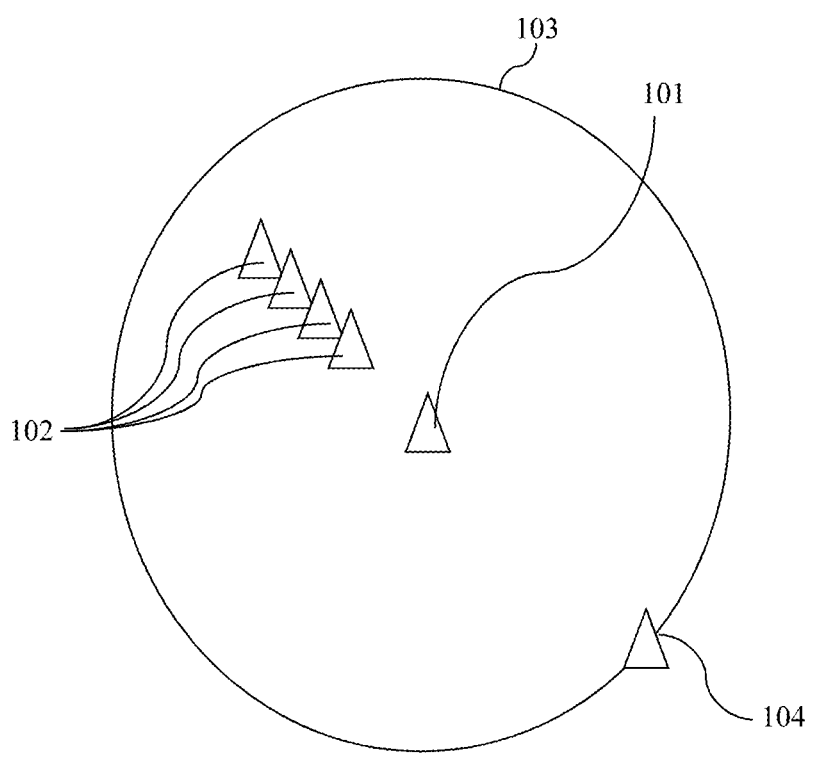
FIG. 1 illustrates the components of an embodiment of the present invention.

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for ad-hoc trigger based data sharing group.

In the following detailed description, numerous specific details are set forth in order to provide a thorough understanding of embodiments of the present invention. However, those skilled in the art will understand that such embodiments may be practiced without these specific details. Just as each feature recalls the entirety, so may it yield the remainder. And ultimately when the features manifest, so an entirely new feature be recalled. Reference throughout this specification to "one embodiment" or "an embodiment" means that a particular feature, structure, or characteristic described in connection with the embodiment is included in at least one embodiment of the invention.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term 'plurality' refers hereinafter to any positive integer (e.g., 1, 5, or 10).

The term 'Join Proximity Index (JPI)' refers hereinafter to a predefined distance required to determine if a user may be a qualified candidate for automatically connecting with an ad-hoc group.

The term 'Disjoin Proximity Index (DPI)' refers hereinafter to a predefined distance required to determine if a user may be a qualified candidate for automatically disconnecting from an ad-hoc group.

The term 'Rejoin Proximity Index (RPI)' refers hereinafter to a predefined distance required to determine if a user may be a qualified candidate for automatically reconnecting with an ad-hoc group to which the user was previously connected.

The term 'Join Proximity Limit (JPL)' refers hereinafter to a predefined distance required to determine if a group has scattered.

The term 'Group Vicinity (ASNV)' refers hereinafter to the minimal circle surrounding the group members and may be represented as the radius from the center of the circle along with the location of the circle's center.

The invention relates to systems and methods for allowing ad-hoc trigger based data sharing, for example a method for automatically sharing photos and other media objects between a group of hand held computing devices located in a common physical location such as a group of people attending a common event while taking pictures and recording videos using their smartphones.

An interesting example for such could be, for example, a large family gathering where participants wish to share all pictures and videos taken in the gathering between them and with others. Doing so may be a tedious task requiring the collecting of the pictures from each and every participant. Generally speaking, the system and method may allow the automatic creation of a common album to which all photos and videos taken by the participants are automatically inserted into while allowing such to be viewed instantaneously by all other participants and may be shared by those participants with others not participating.

In its broader sense, the system and method may allow social networks to evolve automatically through automatic analysis of user behavior and/or user actions, and thus to gain new advantages and capabilities in the field of social network.

However, in other embodiments of the invention, further uses of the system and method may allow different uses as the activities of users may be identified using the hand held computing device's sensors, for example, by analyzing user velocity of movement, the system and method may allow to track users who are all running in a common area. Required proximity indices may be defined specifically for such application. In addition, user defined proximity parameters may be used so users may gather to exercise together or to share relevant information which may be of interest to one another. Such application may be applied to additional sporting activities. (e.g. walking, hiking, biking, boating, gliding, etc.)

In addition, in cases in which the computing device is not a hand held but embedded in objects, further applications may allow the creation of ad-hoc groups of users of objects such as: clothing, pet related products (for example, leash collar) for pet communities, baby/children related products for parent communities (for example, baby stroller), wearable computing devices, medical devices (for example, house medical devices), hobby related products for just about anything.

In other embodiments of the invention, the triggering event may be based on predefined operations carried out through third party device applications, for example, the system and method may recognize users attending a common consumer space (such as a shopping center, market place, etc.) and who are carrying out transactions using digital wallet applications. In such case the triggering event for creating or joining a group may be the operation carried out by the digital wallet application. Users may then make use of the group for sharing consumer information which may be of interest to one another, for getting to know each other, etc.

Another example for such may be used for a new kind of computer games which may combine gaming activity on the device as well as gaming activity in the real life physical space.

As can be appreciated from the above mentioned, the system may be implemented using a non-transitory computer-readable medium storing processor executable instructions on a computing device.

As depicted in FIG. 1, the system may first allow a user 101 to set and initiate one or more data sharing groups or initiate a predefined group. For example, the user may set a "family gathering" group and then the system may allow the user to set automatic or semi-automatic trigger for allowing other users (via their computing devices 102) to join the group. Such trigger may be the join proximity index (WI) 103 as well as allowing the user to further set automatic or semi-automatic trigger for allowing or forcing other users to disconnect from the group 104, as can be appreciated such trigger may be the disjoin proximity index (DPI). The user may further set triggers based on the rejoin proximity index (RPI), the join proximity limit (JPL) and the group vicinity (ASNV). The system may allow users to use a predefined set of parameters and triggers and hence void the need of a specific user to set such in advance or in real time.

The user may, at any time he or she chooses to, terminate the group or set triggers to do so.

Once a group is initiated, the system will wait for data communication from other computing devices running a compatible system. Such data communication may be direct, such as in cases of Bluetooth connection or indirect connection such as in a case of intermediate internet server.

In one embodiment of the invention, the initiating computing device will receive data communication sent from other computing devices and a hand shake process will commence. Such hand shake may be in some embodiments as simple as sending and receiving only the information required for determining if a predefined trigger was met and in other embodiments such hand shake may be a more complex process in which the initiating device will send the other device a query and the other device will reply and allow the initiating device to determine if the trigger conditions are met or not. In other embodiments of the invention, whereby an intermediate internet server is deployed, such process will be performed between the server and the other computing devices.

The trigger events may be based on sensor information. In an embodiment of the invention, for example in a "family gathering" as mentioned above, the trigger would be the physical distance between the users and hence, for example, a GPS sensor information from both devices is required. In another embodiment of the invention, use of the computing device's camera or other sensor may as well be a trigger to the joining or creation of a group.

In some embodiments of the invention, the trigger event may be any one or combination of triggering events such as location or area based, time span based, action based and/or data received/analyzed based such as face recognition, object recognition, biometric recognition, speech recognition, speech analysis, $3^{rd}$ party application data or trigger, etc. in a specific embodiment of the invention, the trigger event may be based on chains of simple conditional statements predefined in the system or via a $3^{rd}$ party application and may, in some cases, be based on occurrences within external web services.

In other embodiments of the invention, a complex timespan parameter may be the triggering event such as rules based on frequency and/or time limits. A specific example may be such that join people who walk their dog at a specific location every Sunday between 8:00-10:00. Other example may be people who run in a specific area for at least 10 hours a week or people who are located in a specific area for at least 8 hours a day and at least 3 times a week.

In further embodiments, the system may have the capabilities to allow users to use relative time or time-location parameters such as "sunset", "sunrise", "moon eclipse", "Radiohead concert today", "Olympic tournament" etc. In further embodiments, the system may have the capabilities to allow users to use absolute time trigger such as to allow creating of a group that may contain any person viewing (not in person) an historic event in real time such as fictional event of the first astronaut to walk Mars.

The system may check if the trigger event conditions are met and hence the other device will be joined to the initiated group or will be rejected. In some embodiments of the invention, the other device will be notified on such while in others it will not be informed in case of rejection.

Once in a group, each user may view identification information of the other users in ways known in the art.

Once in a group, each device may receive and send predefined type of information. In the current example, media files such as pictures and videos taken using the user's hand held devices such as smartphones and tablets may be automatically shared with all other users in the group. In some embodiments, sharing will be semi-automatic, for example by asking the user if to share the currently taken picture in real time or even manual, for example by just allowing the user to share to the group from the device's gallery.

As can be understood, the system on the other device, or non-initiating device, will act slightly different. In such case, the system will first allow the user to define the joining policy, for example, the user may choose to automatically enter to any group or whitelisted groups or the user may be prompted for approval prior to joining.

Next, the system may allow the user to enter into a lookout mode in which a direct or indirect (as explained above) groups searching is performed by the system.

Once a group is located the system will sense using the relevant sensor and perform the hand shake as mentioned above with the initiating device or with an intermediate internet server.

In some embodiments of the invention, the initiating device system and the non-initiating device system would be the same application running in two different modes while in other embodiments, the applications would be separate.

In further embodiments of the invention, the data communication or part of the data communication between the device may be performed directly, for example using Bluetooth or any P2P capabilities of the computing devices. In other embodiments the communication may be done indirectly, for example using the internet, local hubs, etc. In even further embodiments, some of the communication may be perfumed via proxy of sorts, i.e. via third parties and using the internet, for example in the case of the "family gathering" the media files may be stored on a SaaS service or other kinds of third party servers.

In several embodiments of the invention, a lean architecture may be deployed in order to allow a server-less activation of the system. In such case, many of the actions required by the system will be outsourced to cloud based services. For example, all data shared may be stored with $3^{rd}$ party data hosting and not locally on the computing devices; databases may be remotely managed by $3^{rd}$ parties; location and mapping services may be provided by $3^{rd}$ parties; social networks and/or payment services may be used to determine triggers; image processing may be performed remotely; data manipulation (such as adding advertisement) may be done by $3^{rd}$ parties on remote locations; etc.

The system may further allow sharing the shared information with third parties which are not members of the group. This may be achieved by allowing actual access to the server or device on which the information is actually stored or using connection to third party applications and servers, for example by allowing the user to share picture files on a social media website. As can be appreciated, in such case and similar cases the third party may retain the information.

In cases in which the sent and received information is stored or passing through third party, such may retain the information and allow further use of such regardless of the group's status and even if the group was terminated.

In some embodiments of the invention, the user of the initiating device may grant "administrator" rights to other users and hence to allow such users to control the group and its triggers. Such granting may be done via the user's user interface which will cause the system to notify the other computing device regarding such, which will allow the other device's system to present the other user with the relevant user interface.

The system may allow the users to interact with the information sent and received within the group both on real time and after group termination. In some embodiments of the invention, time limits may be enforced on such interaction.

In some embodiments of the invention, computational methods which incorporate improved precision, based, for example, on studies in the field of Proxemics and social behavior, may incorporate triggers which require information from a variety of sensors such as accelerometer, location sensors, light sensor, magnetic sensor, microphone, Bluetooth, Wi-Fi and cellular antenna.

In several embodiments of the invention, the system may require only a single incident of sensing while in others a periodic sensing would be required. For example, in cases in which the trigger is based on a local location, such as a tourist attraction only one sensing session is required in order to resolve that a device is in join proximity while in cases if "family gathering" a periodic or even continual sensing would be required.

In several examples, the system may allow creation of a group based on proximity to a known location, for example a group located in the same building, the same room, etc. In another example the known location may be the proximity from a tourist attraction such as the Rome amphitheater. In this case, a group of all tourists near the location may be created and be allowed to share information and media.

However, in such cases where a large crowd or continuous changes in the group are in order, the system may allow a periodic change of the administrator of the group as well as employing time limits, i.e. share the information with people visiting the same place at the same time and not with people who visited or will visit at different times. Hence, a parameter of predefined timeframe may be inputted by the user or be predefined by the system in order to decrease the information volume.

In several embodiments of the invention, it may be possible that a single group will be merged with another as their trigger conditions are all met. In such cases, this action may happen automatically or manually, according to the users' predefinition.

In some cases, the triggers will not be set per se by the user but rather by third party application. For example, the user may set a "trigger" which is actually "am I in proximity to a tourist attraction according to a specific online map".

In other embodiments of the invention, the group may be a group of users who attend a specific shopping mall or a store. In such cases, the trigger may be set to be a purchasing transaction of a digital wallet or other purchasing transaction indicator in or in connection with the computing device.

In further embodiments of the invention, the group may be a group of users who purchased a specific item, an item of a specific kind, an item of a specific brand, etc. regardless of their location. Information as such required may be provided, in some embodiments of the invention, by a third party such as the digital or electronic wallet operator, a vendor, etc.

In even further embodiments of the invention, the group may be a group based on a moving location, for example, all the passengers of a bus. In this case, the trigger might be only the proximity between the users without any consideration to the actual location.

In other embodiments of the invention, a group may be divided into subgroups, for example, based on the proximity triggers of the group. In a specific example, an initiating user may use predefined set of proximity rules which set the option for dividing.

In some embodiments of the invention, wherein the system is mainly media sharing system, the basic operations of the system may be described as follows:

Automatically Joining an Album
- A user arrives at a location for attending an event or social-gathering.
- The user is automatically recognized by the system as being in join proximity.
- The user is now offered to become a member of this album.
- If the user consents and is approved by an administrator, the user may now view: album photos and album users.
- When the user captures a picture and allows its sharing, the picture will automatically become part of the album, and may be instantly viewed by other users.
- The user may add comments relating to a specific picture or relating to the album itself.

Automatic Album Creation
- A user arrives at a location for attending an event or social-gathering.
- The user is not in join proximity with an existing album, or was reluctant to join one.
- The user takes a photo.
- The system suggests creating a new album.
- The system may suggest a default album name, based on current location and time.
- If the user consents, the album will be created and the picture becomes part of it.
- The user may change or add details to the album info.
- Other users in join proximity are prompted to become members of this album.

Automatically Disconnecting from an Album
- All users who are currently members of an album, are periodically sensed in order to make sure they have not moved out of the trigger proximity of the album.
- If a member has moved out of the trigger proximity, the member may receive a notification and is automatically marked as disconnected member.
- A disconnected member may still be able to view the album and to add comments to the album or to the relevant part of the album.
- A disconnected member may not add photos to the album.
- A user may be a member of many albums, but may be joined to only predefined number of albums at a time.
- When only 2 users remain joined to an album, and they move out of proximity from each other, then they may be both automatically disconnected.

Automatically Rejoining an Album
- If the album is an active album and a disconnected member returns to album's rejoin proximity, the system may offer to once again become a member of the album.

Album View Sharing
- An album member may share the album for viewing, with a non-member.
- Such a non-member may be called an album guest.
- A guest may receive a link to the album for viewing.
- A guest may not be able to add photos to the album, but may be allowed to add comments.
- A guest may be able to share the album with other guests according to predefined permissions.

Figure 2:
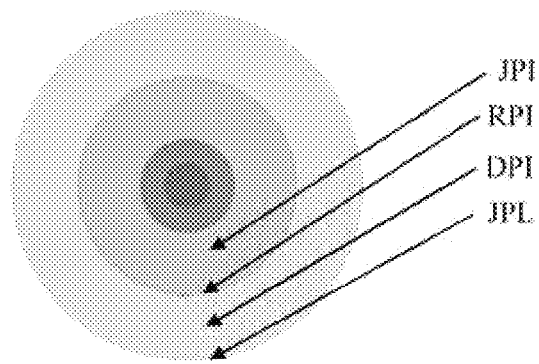
FIG. 2 illustrates a distances diagram.
Figure 3:
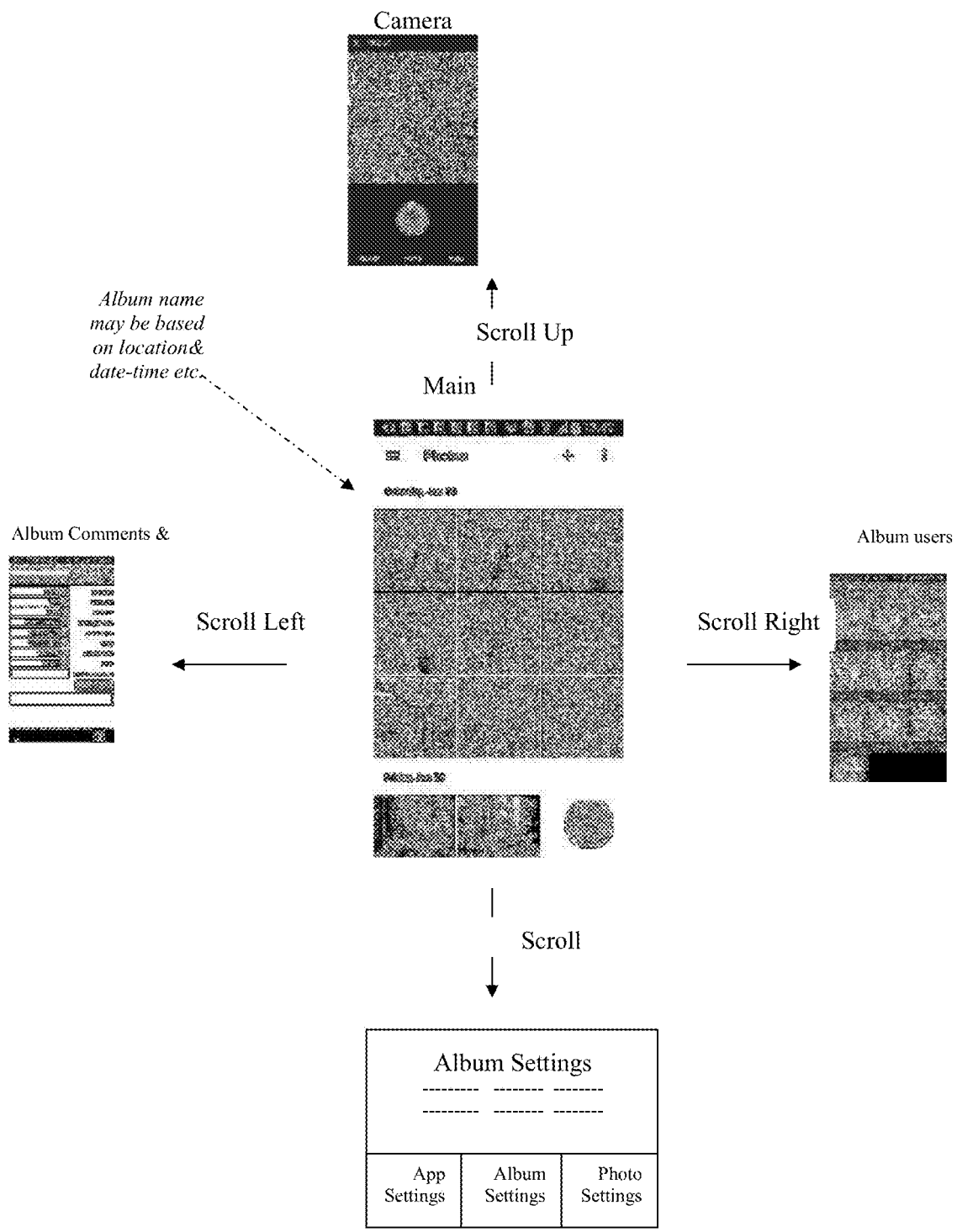
FIG. 3 illustrates user interface of an embodiment of the present invention.

In some embodiments of the invention, implementation of the above rules and definitions, i.e. computing JPI, DPI, RPI, and JPL may be based on studies of Proxemics. Proxemics is the study of the spatial requirements of humans and the effects of population density on behavior, communication, and social interaction. Specifically, one may employ a study by Edward T. Hall, cultural anthropologist, who studied the impact of proxemic behavior on interpersonal communication and defined a scale of zones of physical distance relating to levels of social distance: Intimate distance, Personal distance, Social distance, Public distance as depicted in FIG. 2.

Based on Hall's conclusions depicted in the diagram, the system may be defined using the following example values:
JPI=8 feet/2.4 meters—Based on average of Personal distance and Social distance;
DPI=18.5 feet/5.6 meters—Based on average of Social distance and Public distance;
RPI=12 feet/3.6 meters—Based on Social Distance;
JPL=25 feet/7.6 meters—Based on Public Distance.

In some embodiments of the invention, the system may allow distance calculation of any sort (for example social and/or geographic distances/areas using other technologies such geofencing, beacons etc.) to be done by an external system, for example by using API of such external system.

In addition to the above computations, the system may enable the user to adapt application outcome to the current physical surrounding, by overriding computed indices using user defined settings. As mentioned above, the system may further make use of numerous sensors available to the users and to determine if a user is, for example, located indoor or outdoor, to analyze sounds and voice levels in the user's surrounding etc., and thus to help determine the best way to group people according to their social connections.

The system may, in some embodiments of the invention, allow automatic or semi-automatic analysis of the user inputted data, such as proximity data and data inputted by users that overrides the default parameters and triggers and may adapt such default parameters and triggers accordingly. Possibly using machine learning techniques, in manners known in the art.

In some embodiments of the invention the system may present users' locations to other users in the group.

In some embodiments of the invention, an interested party, such as business owner or touristic location manager may create rules for initiations and/or actually initiate a group in order to promote a location or advertise a business. Such may be done by defining of time span and location or, as is in other embodiments, defining a reference to a known location or it's vicinity whether sensed by sensors in the computerized devices or reported by a $3^{rd}$ party location service (such as mapping services). Furthermore, the trigger may refer to a known event or occasion (time & place) recognized by a $3^{rd}$ party social network or alike.

In some embodiments, the system will be adapted to charge the interested party for the use or even allow the interested party to charge end users for the use.

In further embodiments of the invention, the system may be adapted to present advertisements. Such may be done in manners known in the art, such as banners. In addition, the system may be adapted to embed advertising materials and other materials on the shared data. For example, the system may allow adding of water marks, logos, text, etc on photos as well as video and audio in relevant file formats. In specific embodiments of the invention, the system may manage database of predefined visual or audio data (such as ads, etc) which are to be embedded in said shared data according to predefined logic. In further embodiments of the invention, the manipulation may be even to the files names, folder names, comments and other metadata of files, external applications information regarding the data, etc.

A very specific example of such may be a birthday event at a bowling alley:
  The bowling alley manager downloads and activates the system.
  The manager signs up through a signup panel for business-owners.
  The manager predefines time, location and default name for the specific birthday party.
  Party guests arriving at the party may have previously activated the system on their smartphones or be persuaded to do so at that point. Once activated their smartphone may be joined to the group by sensing the location (GPS, wifi, etc.) or use a QR-code located on site or even using a link sent to their device in manners as known in the art.
  From this point on, the system is activated using system defaults and operates as a background service on the guests' devices.
  The bowling alley's name, logo or specific advertisement will be embedded within all the data shared (such as albums and photos).
  The guests may order merchandise, via the system, on which selection of the shared data will be printed or otherwise presented. Such may be accomplished by interfacing with $3^{rd}$ party suppliers. The merchandise may further include advertisements.

In some embodiments of the invention, the system may be activated on a computing device without the need of any user interface and may solely run in the background.

In such case, once a user activates the system (usually by downloading it and installing it), the user will automatically be assigned with predefined rules and logic. User's data (for example, pictures taken) may be automatically shared into the group as long as the defined trigger was activated (in some cases, more than one trigger may be predefined). This may be done according to default system criteria and/or according to pre-defined criteria which was predefined by the user (such as in a website or an application).

The user, in such case, may view the group data and info using proprietary application or website and/or $3^{rd}$ party application or website.

Although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. A non-transitory computer-readable medium storing processor executable instructions on a computing device, when executed by a processor, the processor executable instructions causing the processor to perform:
   analyzing sensor output of a user device to determine an activity of a user;
   initiating a group in response to a result of said analyzing;
   setting a trigger condition for adding a new user to said group, said trigger condition appropriate for said activity;
   sensing sensed information from at least one sensor of a computing device of a new user;
   determining when said sensed information meets said trigger condition; and
   joining said new user to said group in response to said sensed information meeting said trigger condition.

2. The instructions of claim 1, wherein said trigger includes an interaction between said new user and another user of the group and wherein said determining includes recognizing said interaction from said sensed information.

3. The instructions of claim 2, wherein said trigger condition includes physical proximity between the new user and said another user of the group wherein social connection includes a determination of social distance based upon said physical proximity.

4. The instructions of claim 3 wherein said instructions are causing the processor to periodically perform:
   receiving sensed information from at least one sensor of at least one other computing device of a new user who is not a member of said group;
   determining when sensed information from said at least one sensor of said at least one other computing device meets said trigger condition;
   joining said new user of said at least one other computing device to said group in response to said sensed information from said at least one sensor of said at least one other computing device meeting said trigger condition
   sharing shared data of a predefined type from at least one sharing computing device of said new user with a plurality of receiving users.

5. The instructions of claim 4, further causing the processor to perform:
   to set at least one trigger for disconnecting a user from said receiving users.

6. The instructions of claim 1 wherein said trigger condition includes physical proximity between said computing device of said new user and a known location and wherein said sensed information of said at least one sensor includes information that facilitates calculation of the physical proximity between said computing device of said new user and said known location.

7. The instructions of claim 6 wherein said known location is received from a third party provider.

8. The instructions of claim 1, wherein said instructions further cause said processor to perform:
   sharing shared data of a predefined type from at least one sharing computing device of said new user with a plurality of receiving users in response to said sensed information meeting said trigger condition.

9. The instructions of claim 8, wherein said instructions are causing the processor to perform: taking measures to allow monetary charging of at least one of a receiving user and an administrator.

10. The instructions of claim 8, wherein said instructions are causing the processor to perform: managing a database of predefined visual or audio data to be embedded in said shared data.

11. The instructions of claim 8, wherein said instructions are causing the processor to perform: offering for sale merchandise with selected data from said shared data included in said merchandise by interfacing a third party supplier.

12. The instructions of claim 8, wherein said sharing is from a plurality of sharing computing devices, at least one computing device of said plurality of sharing computing devices pertaining to each of a plurality of members of said group.

13. The method of claim 8, further comprising:
setting at least one trigger for disconnecting a user from said receiving users.

14. The instructions of claim 8, wherein said shared data includes sharing a photo taken by said user a photo taken by said new user between all users of the group.

15. The instructions of claim 14, wherein said instructions further cause said processor to perform:
at least one processing of facial recognition, voice recognition and/or object recognition and wherein said trigger condition is dependent on said processing.

16. The instructions of claim 14, wherein said sharing is conditional on at least one stipulation selected from the group consisting of a time that the photo was taken, a location at which the photo was taken and a content of the photo.

17. The instructions of claim 14, wherein said trigger includes recognition of attendance at a common event between said new user and said user.

18. The instructions of claim 1, wherein said instructions further cause said processor to perform:
gathering said user and said new user.

19. The instructions of claim 18, wherein said instructions further cause said processor to perform,
analyzing an activity of said new user and
wherein gathering said user and said new user is in response to said user and said new user performing a same activity.

20. The instructions of claim 19, wherein said same activity includes at least one member selected from the group consisting of a sports activity, walking a pet, a hobby, using a particular category of Internet of things marked object, taking a photo of members of a particular gathering of people, taking a photo of a particular event and watching a child.

21. The instructions of claim 20, wherein said same activity is a habitual activity performed by both said user and said new user at similar intervals.

22. The instructions of claim 19, wherein said trigger condition includes said user and said new user performing said activity in at least one of a same time and a same reoccurring time.

23. The instructions of claim 19, wherein said activity includes a sport and said analyzing includes determining a level of trigger condition includes said user and said new user performing a sport at a similar level.

24. A method for ad-hoc trigger based group comprising steps of:
analyzing sensor output of a user device to determine an activity of a user;
initiating a group appropriate for said activity;
setting a trigger condition for adding a new user to said group;
receiving sensed information from at least one sensor of a computing device of a new user;
determining when said sensed information meets said trigger condition; and
joining said new user to said group in response to said sensed information meeting said trigger condition.

25. The method of claim 24, further comprising:
setting at least one trigger for disconnecting a user from said group.

26. The method of claim 24, further comprising:
sharing shared data of a predefined type from at least one sharing computing device of said new user with a plurality of receiving users in response to said sensed information meeting said trigger condition.

27. The method of claim 26, wherein said sharing is partly or completely performed via a proxy and said proxy partly or completely retains said shared data.

28. The method of claim 26, further comprising:
receiving sensed information from at least one sensor of at least one other computing device pertaining to at least one other user who is not in said group;
determining when sensed information from said at least one sensor of said at least one other computing device meets said trigger condition;
joining said at least one other user to said sharing in response to said sensed information from said at least one sensor of said at least one other computing device meeting said trigger condition.

29. The method of claim 26, wherein access to said shared data is time limited according to a predefined timeframe.

30. The method of claim 26, further comprising:
taking measures to allow monetary charging of at least one of said plurality of a receiving user and an administrator.

31. The method of claim 26, further comprising:
offering for sale merchandise with selected data from said shared data included in said merchandise by interfacing a 3rd party supplier.

32. The method of claim 26, wherein said sharing is from plurality of sharing computing devices, at least one computing device of said plurality of sharing computing devices pertaining to each of a plurality of members of said group.

33. The method of claim 26, wherein said shared data includes sharing a photo taken by said user a photo taken by said new user between all users of the group.

34. The method of claim 33, further comprising:
performing processing including at least one of facial recognition, voice recognition and/or object recognition and wherein said trigger condition is dependent on said processing.

35. The method of claim 33, wherein said sharing is conditional on at least one stipulation selected from the group consisting of a time that the photo was taken, a location at which the photo was taken and a content of the photo.

36. The method of claim 33, wherein said trigger includes recognition of attendance at a common event between said new user and said user.

37. The method of claim 24, wherein said trigger condition includes physical proximity between the new user and another user of the group wherein social connection includes a determination of social distance based upon said physical proximity.

38. The method of claim 24 wherein said trigger condition includes physical proximity between said computing device of said new user and a known location and wherein said sensed information of said at least one sensor includes information that facilitates calculation of the physical proximity between said computing device of said new user and said known location.

39. The method of claim 38 wherein said known location is received from a third party provider.

40. The method of claim 24 wherein said trigger condition includes physical proximity between said computing device of said new user and a moving object and wherein said sensed information of said at least one sensor includes information that facilitates calculation of the physical proximity between said computing device of said new user and to said moving object.

41. The method of claim 24, wherein said trigger includes an interaction between said new user and another user of the group and wherein said determining includes recognizing said interaction from said sensed information.

42. The method of claim 24, further comprising:
gathering said user and said new user.

43. The method of claim 42, further comprising,
analyzing an activity of said new user and
wherein said gathering said user and said new user is in response to said user and said new user performing a same activity.

44. The method of claim 43, wherein a same activity includes at least one member selected from the group consisting of a sports activity, walking a pet, hobby, using a particular category of Internet of things marked object, taking photos of members of a particular gathering of people, taking a photo of a particular event and watching a child.

45. The method of claim 44, wherein said same activity is a habitual activity performed by both said user and said new user at similar intervals.

46. The method of claim 43, wherein said trigger condition includes said user and said new user perform said activity in at least one of a same time and a same reoccurring time.

47. The method of claim 43, wherein said activity includes a sport and said analyzing includes determining a level of trigger condition includes said user and said new user performing a sport at a similar level.

* * * * *